(12) United States Patent
Odajima et al.

(10) Patent No.: US 9,666,348 B2
(45) Date of Patent: May 30, 2017

(54) VIBRATION ACTUATOR

(71) Applicant: Nidec Copal Corporation, Tokyo (JP)

(72) Inventors: Shin Odajima, Tokyo (JP); Yoshihide Tonogai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 14/600,308

(22) Filed: Jan. 20, 2015

(65) Prior Publication Data

US 2015/0206639 A1    Jul. 23, 2015

(30) Foreign Application Priority Data

Jan. 21, 2014  (JP) ................. 2014-009007
Jan. 21, 2014  (JP) ................. 2014-009008
Aug. 8, 2014   (JP) ................. 2014-163019
Aug. 8, 2014   (JP) ................. 2014-163020

(51) Int. Cl.
| | |
|---|---|
| *H02K 33/00* | (2006.01) |
| *H01F 7/10* | (2006.01) |
| *H02K 33/02* | (2006.01) |
| *B06B 1/16* | (2006.01) |
| *H02K 33/06* | (2006.01) |
| *H02K 33/16* | (2006.01) |
| *B06B 1/04* | (2006.01) |
| *H01F 7/14* | (2006.01) |
| *H04M 19/04* | (2006.01) |
| *B06B 1/14* | (2006.01) |

(52) U.S. Cl.
CPC ............. *H01F 7/10* (2013.01); *B06B 1/045* (2013.01); *B06B 1/14* (2013.01); *B06B 1/16* (2013.01); *H01F 7/14* (2013.01); *H02K 33/02* (2013.01); *H02K 33/06* (2013.01); *H02K 33/16* (2013.01); *H04M 19/047* (2013.01)

(58) Field of Classification Search
CPC ........ H02K 33/02; H02K 33/06; H02K 33/16; B06B 1/04–1/045; B06B 1/16–1/168
USPC ........................................................ 310/36
See application file for complete search history.

(56) References Cited

U.S. PATENT DOCUMENTS

| | | | | |
|---|---|---|---|---|
| 2,917,758 A | * | 12/1959 | Held ................. | A61C 17/3472 |
| | | | | 15/22.1 |
| 2003/0011252 A1 | * | 1/2003 | Langberg ............... | H02K 33/16 |
| | | | | 310/36 |

FOREIGN PATENT DOCUMENTS

| | | |
|---|---|---|
| JP | H10-336949 | 12/1998 |
| JP | 2012-016153 | 1/2012 |

* cited by examiner

*Primary Examiner* — Ramon M Barrera
(74) *Attorney, Agent, or Firm* — Troutman Sanders LLP

(57) ABSTRACT

A vibration actuator includes: a movable element having a magnet that is supported to be rotatable around a shaft, a weight supported to be rotatable together with the magnet, and an elastic supporting member wherein a rotation of the magnet and the weight is supported elastically; a coil that is supplied with an AC current at a frequency that is equal to a resonant frequency of the movable element; and a magnetic pole member that causes the movable element to undergo reciprocating a rotational vibration around the shaft through applying rotational torques in different directions alternatingly to the magnet by changing magnetic poles through the AC current that is applied to the coil.

8 Claims, 11 Drawing Sheets

(a)

(b)

(a)

(b)

(a)

(b)

VIBRATION ACTUATOR

CROSS REFERENCE TO RELATED APPLICATIONS

This application claims priority under 35 U.S.C. §119 to Japanese Patent Application Nos. 2014-009007, filed on Jan. 21, 2014, 2014-009008, filed on Jan. 21, 2014, 2014-163019, filed on Aug. 8, 2014, and 2014-163020, filed on Aug. 8, 2014, the entire contents of which being hereby incorporated herein by reference.

FIELD OF TECHNOLOGY

The present invention relates to a vibration actuator for generating a vibration.

BACKGROUND

Mobile electronic instruments such as mobile telephones, mobile information terminals, and the like, are provided with a vibration generating function that notifies a mobile user, without producing a noise, that there has been a signal event, such as an incoming call, an alarm, or the like, and vibration actuators are built into mobile electronic instruments in order to produce such a function.

Linear resonant actuators (LRAs) are known as such vibration actuators that are built into such mobile electronic instruments. See, for example, Japanese Unexamined Patent Application Publication No. 2012-016153. In LRAs, a current that alternates equal to the natural vibration frequency of a weight that is suspended on a spring is supplied to interact with a magnet to cause the weight to undergo reciprocating linear vibrations in a linear direction. An eccentric rotating mass is known as a DC motor-type vibration actuator wherein an eccentric weight is attached to a shaft and the shaft is rotated to produce a vibration. See, for example, Japanese Unexamined Patent Application Publication No. H10-336949. Because LRA does not have a contact point rectifier as does ERM, the reliability and durability are higher, making it well suited to applications with high-frequency operation, such as when used for haptics in a touch panel in addition to being used as an incoming call alarm.

The vibration level in an LRA is determined by the mass of the movable element and the amplitude with which it vibrates, and thus when attempting to produce a maximum vibration level in a limited space, due to being built into a mobile electronic instrument, the amplitude of the vibration is set within the maximum range of the interior dimensions of the case, so contact between the movable element and the case is unavoidable. When the movable element contacts the case, at that time a striking sound, or a buzzing sound that is caused by the striking, is produced, and thus there is a problem in that it is not possible to satisfy the actual purpose of the vibration actuator, which is provided in order to communicate noiselessly to the mobile user that there is a signal event.

While to handle this typically a cushion material is interposed between the movable element and the case in order to mitigate the noise that is produced, this cannot completely eliminate the noise, and is not a true solution strategy. Moreover, when attempts are made structurally to avoid contact, then either the amplitude of the movable element must be made smaller relative to the case, or the case must be made larger relative to the amplitude of the movable element, making it impossible to satisfy demands for increased amplitude of vibration with a smaller size.

Moreover, there are increasing demands for mobile electronic instruments to be made thinner, such as with wearable instruments. For these, the conventional LRA is based on a structure wherein a coil is coiled around a magnet, which is a portion of the movable element, and thus there are structural limitations to the thickness that is required in order to be built into these thinner mobile electronic instruments.

In the present invention, the handling of such a situation is one example of the problem to be solved. That is, an aspect of the present invention is to, for example, provide a vibration actuator that is able to produce a large vibration amplitude with a smaller unit through the use of a mechanism wherein, fundamentally, the movable element does not strike the case, while still producing the benefit of the LRA in that it does not have a contact point rectifier, and thus can produce higher reliability and durability, to provide a thin vibration actuator that is able to respond to demands for improved thinness, and the like.

SUMMARY

In order to achieve such an aspect, the present invention provides a vibration actuator including, for example: a movable element having a magnet that is supported so as to be able to rotate around a shaft, a weight supported so as to be able to rotate together with the magnet, and an elastic supporting member wherein a rotation of the magnet and the weight is supported elastically; a coil that is supplied with an AC current at a frequency that is equal to a resonant frequency of the movable element; and a magnetic pole member that causes the movable element to undergo reciprocating a rotational vibration around the shaft through applying rotational torques in different directions alternatingly to the magnet by changing magnetic poles through the AC current that is applied to the coil.

In order to achieve such an aspect set forth above, the present invention also provides a vibration actuator including, for example: a movable element having a rotational shaft that is supported on a bearing, a magnet that is secured to the rotational shaft, a weight that is secured to the rotational shaft, and an elastic supporting member wherein a rotation of the magnet and the weight is supported elastically; a coil that is supplied with an AC current at a frequency that is equal to a resonant frequency of the movable element; and a magnetic pole member that applies rotational torques in different directions alternatingly to the magnet by changing magnetic poles through the AC current that is applied to the coil. The coil, the magnet, and the weight, are arranged lined up along the rotational shaft.

BRIEF DESCRIPTIONS OF THE DRAWINGS

DETAILED DESCRIPTION

In a vibration actuator according to an example according to the present invention, the vibration amplitude is maximized and the vibration of the movable element is contained within a given space even when there is variability in the vibration amplitude, through having the movable element undergo reciprocating rotational vibration around a rotational shaft. This is able to prevent fundamentally the production of a striking noise or a buzzing noise that would be caused by the movable element contacting the surrounding case. Moreover, in the vibration actuator according to an example according to the present invention, a driving portion, for causing the movable element to undergo reciprocating rotational vibration through the application, to the magnet, of alternating rotational torques in different directions, is structured from a coil that supplies an AC current at a frequency that is the same as the resonant frequency of the movable element, and a magnetic pole member wherein the magnetic polarization is switched depending on the AC current that is applied to the coil. This makes it possible to produce high reliability and durability when compared to a rectifier that has contact points, such as in ERM.

A vibration actuator according to the examples according to the present invention, having such distinctive features, is able to provide a vibration actuator that can produce a larger vibration amplitude in a smaller size through the use of a mechanism wherein, fundamentally, the movable element does not strike the case, while still producing the benefit of an LRA in that it has no contact point rectifier, resulting in high reliability and durability.

Figure 1:
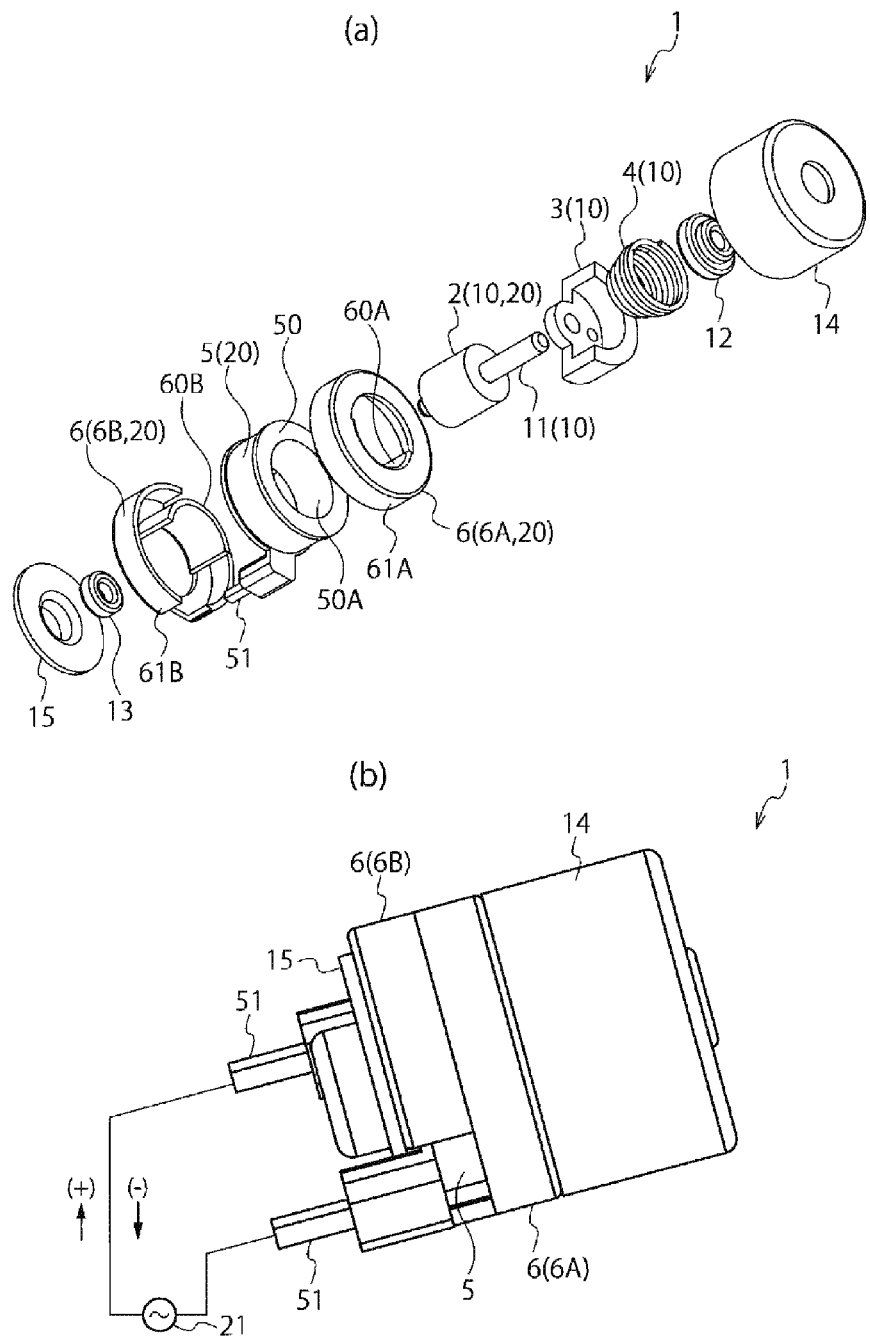
FIG. 1 is an explanatory diagram illustrating the overall structure of a vibration actuator according to an example according to the present invention (where (a) is an assembly perspective diagram and (b) is an external side view diagram).
Figure 2:
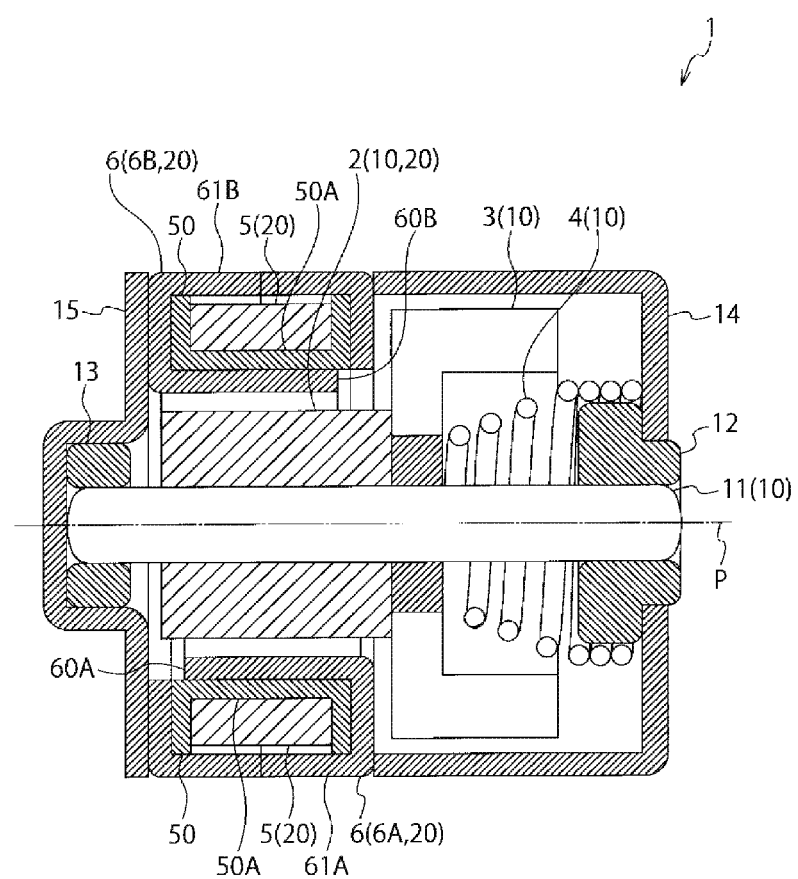
FIG. 2 is a cross-sectional diagram of a vibration actuator according to an example according to the present invention.

Examples according to the present invention will be explained below in reference to the drawings. FIG. 1 is an explanatory diagram illustrating the overall structure of a vibration actuator according to an example according to the present invention (where (a) is an assembly perspective diagram and (b) is an external side view diagram) and FIG. 2 is a cross-sectional diagram of a vibration actuator according to an example according to the present invention.

A vibration actuator 1 is provided with a movable element 10 that is provided with a magnet 2 that is supported so as to be able to rotate around a rotational shaft P, a weight 3 that is supported so as to be able to rotate together with the magnet 2, and an elastic supporting member 4 that supports elastically the rotation of the magnet 2 and the weight 3. In the example in the illustration, a rotational shaft 11, which is also in the movable element 10, is supported by a pair of bearings 12 and 13 so as to be able to rotate, where the magnet 2, the weight 3, and the elastic supporting member 4 are arranged along this rotational shaft 11, where the magnet 2 and the weight 3 are rigidly secured to the rotational shaft 11. Moreover, one end of a torsion coil spring, as the elastic supporting member 4, is secured to the weight 3, and the other end is secured to the case through a bearing 12, so that the movable element 10 will be in a state wherein it can undergo reciprocating rotational motion, in a state wherein it is suspended from the torsion coil spring, which is the elastic supporting member 4, when there is no current applied to a driving portion, described below.

A driving portion 20 that causes the movable element 10 to undergo reciprocating rotational vibration around the shaft P is structured from a magnet 2, which is also a portion of the movable element 10, a coil 5, and magnetic pole members 6. An AC current of the same frequency as the resonant frequency of the movable element 10 is supplied to the coil 5 from an AC current generating source 21 that is connected to a lead out terminal 51 of the coil 5. The resonant frequency of the movable element 10 is an the natural vibrating frequency f0 that is determined by the inertia J of the movable element 10 and the spring constant k, in the torsional direction, of the elastic supporting member 4, and can be calculated through $f0=(1/2\pi)\cdot(k/J)^{1/2}$. The magnetic pole members 6 are provided with a plurality of magnetic pole pieces 60A and 60B that face the magnetic poles of the magnet 2, where the magnetic poles are changed by the AC current that flows in the coil 5, to apply alternatingly, to the magnet 2, rotational torques in different directions.

The coil 5 is held in a coil holding member 50 that has a cylindrical portion 50A through which the rotational shaft 11 passes, and is wrapped around the periphery of the rotational shaft 11 (the shaft P) through wrapping onto the cylindrical portion 50A. This coil 5 is contained within coil containing portions 61A and 61B of the magnetic pole members 6 (claw poles 6A and 6B) that have magnetic pole pieces 60A and 60B that face the magnet 2, and is inserted into a toroidal magnetic circuit that is formed by the magnetic pole members 6, to induce different magnetic poles at the magnetic pole pieces 60A and 60B through applying a current to the coil 5.

In the example in the figure, for the two magnetic pole members 6 (claw poles 6A and 6B), the respective magnetic pole pieces 60A and 60B are inserted and secured on the inside of the cylindrical portion 50A of the coil holding member 50, so that the magnetic pole member 6 supports the coil holding member 50. Moreover, the bearings 12 and 13 that support the rotational shaft 11 to which the magnet 2 and the weight 3 are secured are secured respectively to bearing cases 14 and 15, where these bearing cases 14 and 15 are secured, through welding, or the like, to the magnetic pole members 6 (the claw poles 6A and 6B). Here the bearing case 14 is a case that is provided with a space therein for containing the weight 3 and the elastic supporting member 4, where the space within the bearing case 14 is the vibrating space for the weight 3.

The weight 3 is an eccentric weight that is semicircular in the planar view, and undergoes rotational vibrations with the outer peripheral surface thereof following along the inner surface of the bearing case 14, and is a mechanism wherein, insofar as it undergoes rotational vibrations around the rotational shaft 11, the weight 3 will not contact the bearing case 14, even if there is a change in the amplitude of the vibration.

Figure 3:
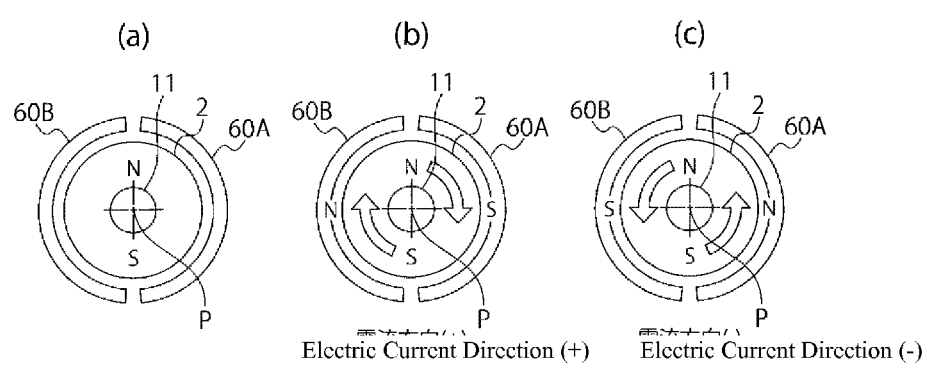
FIG. 3 is an explanatory diagram illustrating the operation of a driving portion of a vibration actuator according to an example according to the present invention. (a) is for a case wherein there is no current, (b) is for a case wherein the current in the coil is in the positive direction, and (c) is for a case wherein the current in the coil is in the positive direction.

FIG. 3 illustrates the operation of a driving portion of a vibration actuator according to an example according to the present invention. (a) is for a case wherein there is no current, (b) is for a case wherein the current in the coil is in the positive direction, and (c) is for a case wherein the current in the coil is in the positive direction. In the example in the illustration, the circular columnar magnet 2 is single-pole magnetized in the diameter direction, to be provided with different magnetic poles around the shaft P. There is no limitation to this, but instead the magnet 2 may be magnetized with multiple poles around the circumferential direction. In contrast, a plurality of magnetic pole pieces 60A and 60B, which face the magnetic poles of the magnet 2, are disposed abutting along the outer periphery of the magnet 2. In the state illustrated in (a) wherein there is no electric current, the magnetic pole pieces 60A and 60B are not magnetized, but the magnetic pole pieces 60A and 60B are magnetized to become mutually differing magnetic poles through the application of an electric current to the coil 5, where the application of an AC current to the coil 5 causes the polarities of the magnetic pole pieces 60A and 60B to invert depending on the positive and negative electric current directions. The inversion of the polarity of the magnetic pole pieces 60A and 60B inverts the directions of the rotational torques that act on the magnet 2, causing the movable element 10 to undergo reciprocating rotational vibration around the shaft P.

Figure 4:
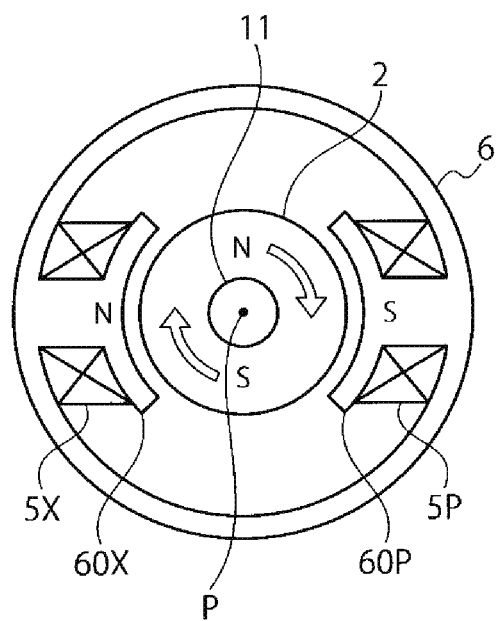
FIG. 4 is an explanatory diagram illustrating an example of another form of a vibration actuator according to an example according to the present invention.

FIG. 4 illustrates an example of another form of a driving portion in a vibration actuator according to an example according to the present invention. In this example, in the same manner as with the example described above, the magnet 2 is a circular columnar magnet that is secured to a rotational shaft 11 and is either single-pole magnetized in the diameter direction or multi-pole magnetized, but the magnetic pole member 6 is ring-shaped, surrounding the magnet 2, and provided with a plurality of magnetic pole pieces 60P and 60X that protrude toward the outer periphery of the magnet 2. Coils 5P and 5X are wrapped, in mutually opposite directions, on the individual magnetic pole pieces 60P and 60X. An alternating current is applied to these coils 5P and 5X to invert the polarities of the magnetic pole pieces 60P and 60X depending on the positive or negative current directions. The inversion of the polarity of the magnetic pole pieces 60P and 60X inverts the directions of the rotational torques that act on the magnet 2, causing the movable element 10 to undergo reciprocating rotational vibration around the shaft P.

Figure 5:
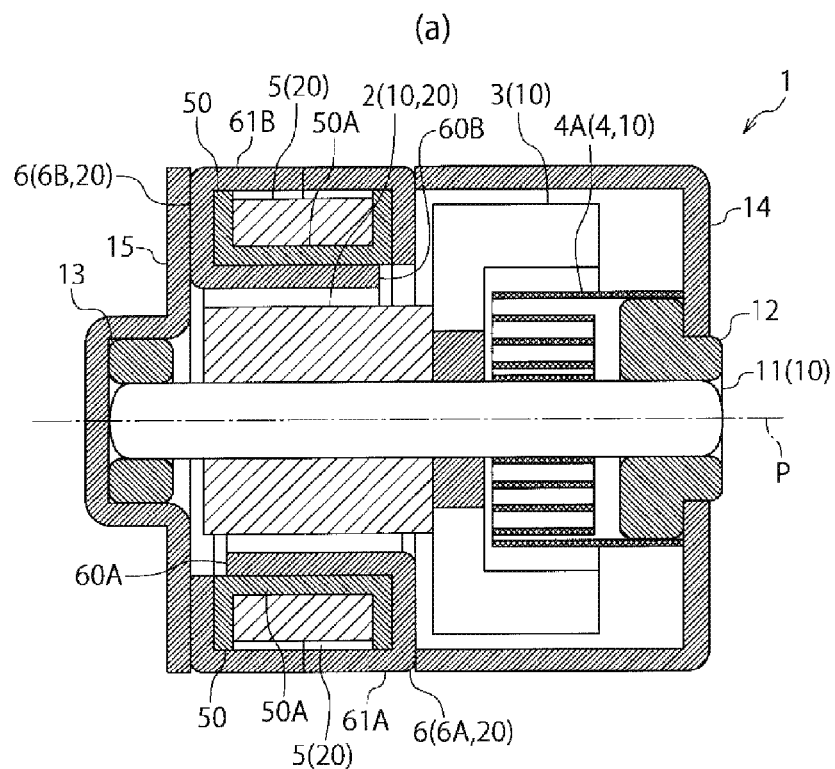
FIG. 5 is an explanatory diagram illustrating an example of another form of a vibration actuator according to an example according to the present invention (where (a) is an overall cross-sectional diagram and (b) is a perspective diagram illustrating a thin spring that is an elastic member).
Figure 5:
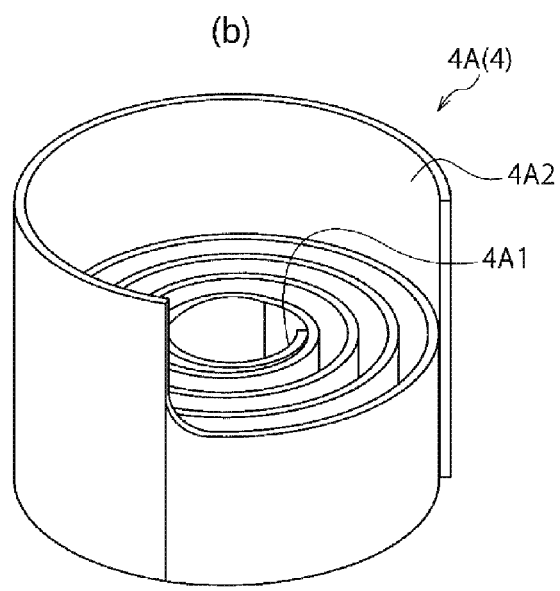

FIG. 5 illustrates an example of another form of a vibration actuator according to an example according to the present invention. In this example, the elastic supporting member 4 that supports the magnet 2 (or the movable element 10) so as to be able to rotate elastically is a flat spiral spring 4A. An overall cross-sectional diagram is illustrated in (a) and the structure of the flat spiral spring 4A is illustrated in (b), where identical codes are assigned to those parts that are identical to those in the example illustrated in FIG. 2, and redundant explanations thereof are omitted. The flat spiral spring 4A is a thin plate-shaped elastic member that is wound in a spiral shape, where the inner end 4A1 is secured to the rotational shaft 11 and the outer end portion 4A2 is secured to a bearing 12 so as to provide torsional elasticity to rotation in one direction of the rotational shaft 11.

In a vibration actuator 1 that uses the flat spiral spring 4A as the elastic supporting member 4, the flat spiral spring 4A has high rigidity in directions other than the direction of rotation, to make it possible to produce a stable rotational vibration, without energy loss, of the elastic supporting member 4, through twisting, without deformation, relative to the rotation of the rotational shaft 11. Note that while FIG. 5 shows an example wherein the outer end portion 4A2 of the flat spiral spring 4A is secured to the bearing 12, instead the outer end portion 4A2 may be secured to a case (the bearing case 14) that supports the bearing 12. The outer end portion 4A2 of the flat spiral spring 4A extends along the rotational shaft 11 in order to be secured to the bearing 12 or the bearing case 14.

Yet another example will be explained. In a vibration actuator according to an example according to the present invention, the vibration amplitude is maximized and the vibration of the movable element is contained within a given space even when there is variability in the vibration amplitude, through having the movable element undergo reciprocating rotational vibration around a rotational shaft. This is able to prevent fundamentally the production of a striking noise or a buzzing noise that would be caused by the movable element contacting the surrounding case. Moreover, in the vibration actuator according to an example according to the present invention, a driving portion, for causing the movable element to undergo reciprocating rotational vibration through the application, to the magnet, of alternating rotational torques in different directions, is structured from a coil that supplies an AC current at a frequency that is the same as the resonant frequency of the movable element, and a magnetic pole member wherein the magnetic polarization is switched depending on the AC current that is applied to the coil. This makes it possible to produce high reliability and durability when compared to a rectifier that has contact points, such as in ERM.

Given this, the parallel arrangement of the coil, magnet, and weight along the rotational shaft that is supported so as to be able to rotate on a bearing enables the vibration actuator to be made thinner, when compared to one wherein the coil is wrapped around the magnet. This makes it possible to provide a vibration actuator able to satisfy demands for greater thinness, in order to be built into a mobile electronic instrument.

Figure 6:
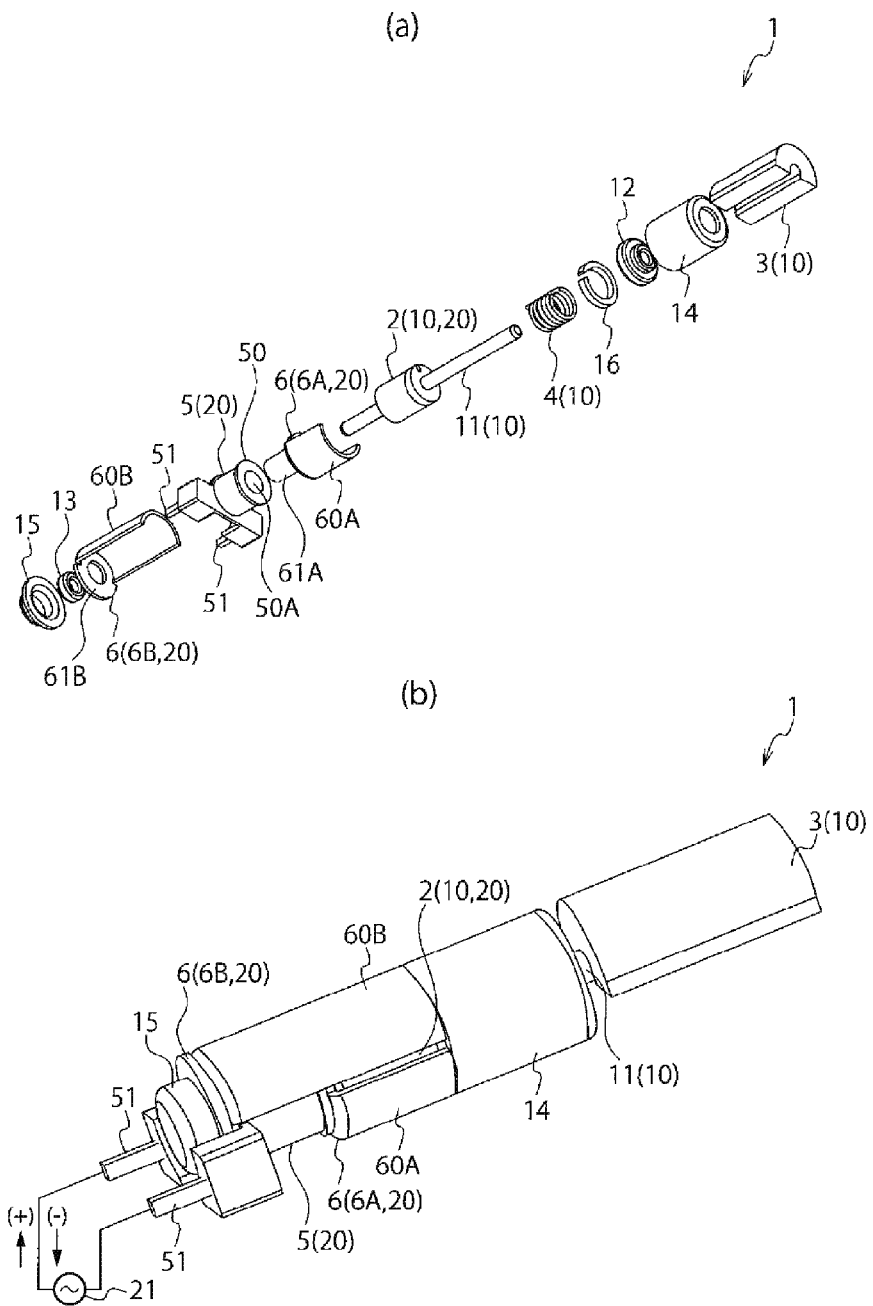
FIG. 6 is an explanatory diagram illustrating the overall structure of a vibration actuator according to another example according to the present invention (where (a) is an assembly perspective diagram and (b) is an external side view diagram).
Figure 7:
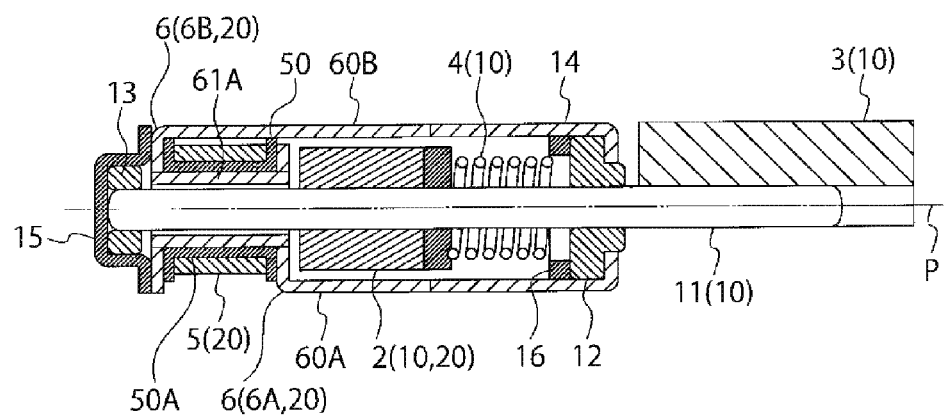
FIG. 7 is a cross-sectional diagram of a vibration actuator according to another example according to the present invention.

An example according to the present invention will be explained below in reference to the drawings. FIG. 6 is an explanatory diagram illustrating the overall structure of a vibration actuator according to an example according to the present invention (where (a) is an assembly perspective diagram and (b) is an external side view diagram) and FIG. 7 is a cross-sectional diagram of a vibration actuator according to an example according to the present invention.

A vibration actuator 1 is provided with a movable element 10 including a rotational shaft 11 that is supported on a pair of bearings 12 and 13 so as to be able to rotate freely, a magnet 2 that is secured to the rotational shaft 11, a weight 3 that is secured to the rotational shaft 11, and an elastic supporting member 4 that supports elastically rotation of the magnet 2. In the example that is illustrated, the magnet 2, the elastic supporting member 4, and the weight 3 are arranged along the rotational shaft 11 that is supported, by the pair of bearings 12 and 13, so as to be able to rotate. Moreover, the magnet 2 and the elastic supporting member 4 are disposed between the pair of bearings 12 and 13, and the weight 3 is secured to the rotational shaft 11 that protrudes to the outside from the pair of bearings 12 and 13. A torsion coil spring, as the elastic supporting member 4, has one end thereof secured to the magnet 2 and the other end thereof secured to a case through a spring retainer 16 and a bearing 12, so that the movable element 10 will be in a state wherein reciprocating rotational motion is possible in a state wherein it is supported by the torsion coil spring, which is the elastic supporting member 4, when no current is applied to the driving portion, described below.

A driving portion 20 that causes the movable element 10 to undergo reciprocating rotational vibration around the shaft P that is the center of rotation of the rotational shaft 11 is structured from a magnet 2, which is also a portion of the movable element 10, a coil 5, and magnetic pole members 6. An AC current of the same frequency as the resonant frequency of the movable element 10 is supplied to the coil 5 from an AC current generating source 21 that is connected to a lead out terminal 51 of the coil 5. The resonant frequency of the movable element 10 is an the natural vibrating frequency f0 that is determined by the inertia J of the movable element 10 and the spring constant k, in the torsional direction, of the elastic supporting member 4, and can be calculated through $f0=(\frac{1}{2}\pi)\cdot(k/J)^{1/2}$. The magnetic pole members 6 are provided with a plurality of magnetic pole pieces 60A and 60B that face the magnetic poles of the magnet 2, where the magnetic poles are changed by the AC current that flows in the coil 5, to apply alternatingly, to the magnet 2, rotational torques in different directions.

The coil 5 is held in a coil holding member 50 that has a cylindrical portion 50A through which the rotational shaft 11 passes, and is wrapped around the periphery of the rotational shaft 11 (the shaft P) through wrapping onto the cylindrical portion 50A. The magnetic pole members 6 supports the coil holding member 50 and is provided with a plurality of magnetic pole pieces 60A and 60B, that are provided extending along the outside of the magnet 2. Here the coil 5 is supported on the coil holding member 50 in a position that is shifted in the axial direction from the position wherein the magnet 2 is secured, disposed within the magnetic circuit that is formed by the magnetic pole members 6 (claw poles 6A and 6B), so as to induce different magnetic poles at the magnetic pole pieces 60A and 60B through the electric current that is applied to the coil 5. In this way, the position of the coil 5 is shifted in the axial direction relative to the position wherein the magnet 2 is secured, thus enabling a structure wherein the coil 5, the magnet 2, and the weight 3 are disposed lined up along the rotational shaft 11.

In the example in the figure, the two magnetic pole members 6 (claw poles 6A and 6B) are connected through a connecting portion 62 that is inserted and secured on the inside of the cylindrical portion 50A of the coil holding member 50. Given this, the magnetic pole members 6 (claw poles 6A and 6B) support the coil holding member 50 at a position that is away from the magnet 2 and is provided with a plurality of magnetic pole pieces 60A and 60B, on the outside of the magnet 2, along the rotational shaft 11.

Moreover, the bearings 12 and 13 that support the rotational shaft 11 are secured respectively to bearing cases 14 and 15, where these bearing cases 14 and 15 are secured, through welding, or the like, to the magnetic pole members 6 (the claw poles 6A and 6B). That is, the bearings 12 and 13 are secured to the magnetic pole members 6 through the bearing cases 14 and 15. Here the bearing case 14 is a case that is provided with a space therein for containing the elastic supporting member 4, where a vibrating space for the weight 3 is formed outside of the bearing case 14. The weight 3 is an eccentric weight that is of a semicircular shape in the plain view, where the track of the outer peripheral surface thereof is about the same as the outer diameter dimension of the bearing case 14, but preferably is formed further toward the inside than that. Note that the elastic supporting member 4 may be provided between the weight 3 and the bearing case 14.

Figure 8:
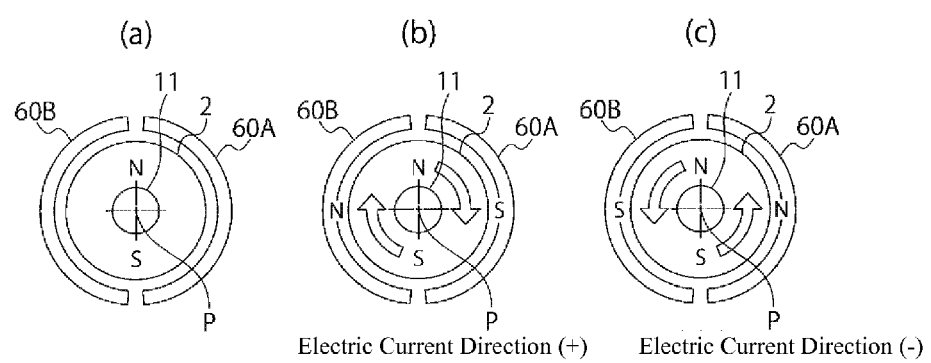
FIG. 8 is an explanatory diagram illustrating the operation of a driving portion of a vibration actuator according to an example according to the present invention. (a) is for a case wherein there is no current, (b) is for a case wherein the current in the coil is in the positive direction, and (c) is for a case wherein the current in the coil is in the positive direction.

FIG. 8 illustrates the operation of a driving portion of a vibration actuator according to an example according to the present invention. (a) is for a case wherein there is no current, (b) is for a case wherein the current in the coil is in the positive direction, and (c) is for a case wherein the current in the coil is in the positive direction. In the example in the illustration, the circular columnar magnet 2 is single-pole magnetized in the diameter direction, to be provided with different magnetic poles around the shaft P. There is no limitation to this, but instead the magnet 2 may be magnetized with multiple poles around the circumferential direction. In contrast, a plurality of magnetic pole pieces 60A and 60B, which face the magnetic poles of the magnet 2, are disposed abutting along the outer periphery of the magnet 2. In the state illustrated in (a) wherein there is no electric current, the magnetic pole pieces 60A and 60B are not magnetized, but the magnetic pole pieces 60A and 60B are magnetized to become mutually differing magnetic poles through the application of an electric current to the coil 5, where the application of an AC current to the coil 5 causes the polarities of the magnetic pole pieces 60A and 60B to invert depending on the positive and negative electric current directions. The inversion of the polarity of the magnetic pole pieces 60A and 60B inverts the directions of the rotational torques that act on the magnet 2, causing the movable element 10 to undergo reciprocating rotational vibration around the shaft P.

Figure 9:
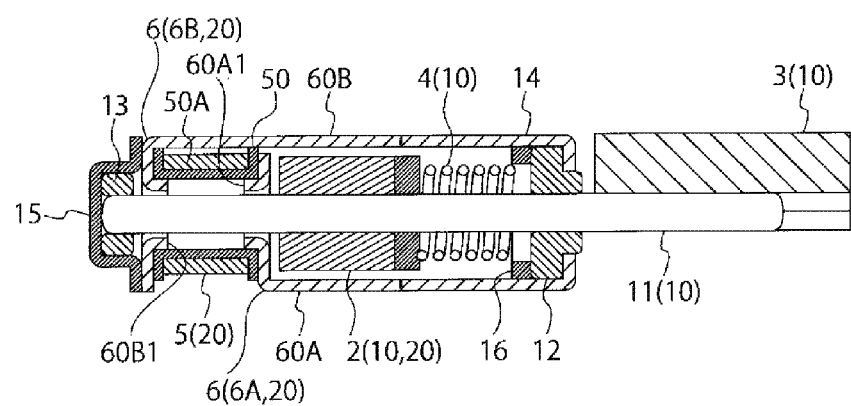
FIG. 9 is an explanatory diagram illustrating another form of a vibration actuator according to an example according to the present invention.
Figure 9:
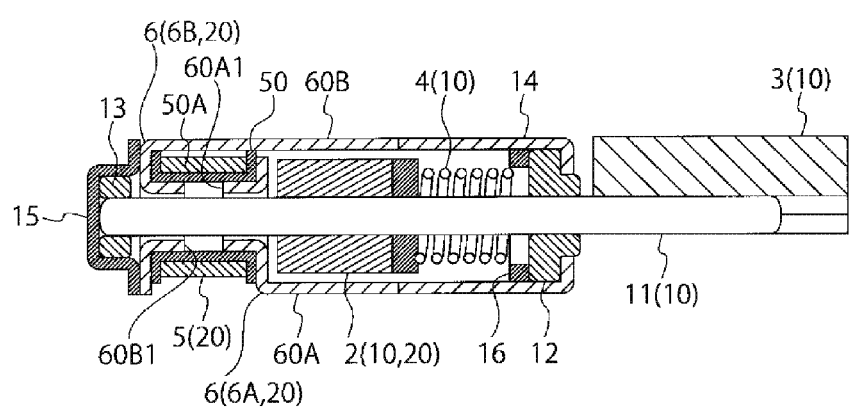

FIG. 9 illustrates an example of another form of a vibration actuator according to an example according to the present invention. Those parts that are identical to those in the examples described above are assigned identical codes, and redundant explanations are omitted. In the examples illustrated in (a) and (b), portions of both of the magnetic pole pieces 60A and 60B have been machined to form supporting portions 60A1 and 60B1 that support the coil holding member 50. In the example in (a), there are supporting portions 60A1 and 60B1 that engage both ends of the cylindrical portion 50A of the coil holding member 50, and in the example in (b) there are supporting portions 60A1 and 60B1 that are inserted partway into the interior of the cylindrical portion 50A of the coil holding member 50. In this way, the number of components can be reduced by supporting the coil holding member 50 by machining parts of the magnetic pole pieces 60A and 60B.

Figure 10:
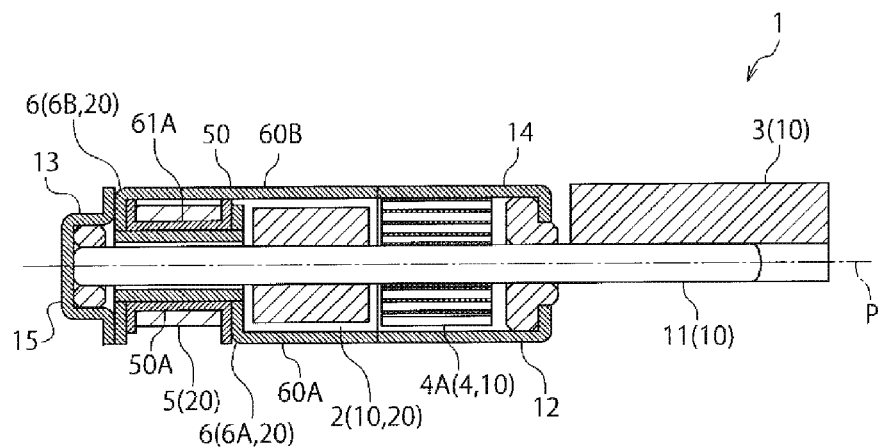
FIG. 10 is an explanatory diagram illustrating an example of another form of a vibration actuator according to an example according to the present invention (where (a) is an overall cross-sectional diagram and (b) is a perspective diagram illustrating a thin spring that is an elastic member).
Figure 10:
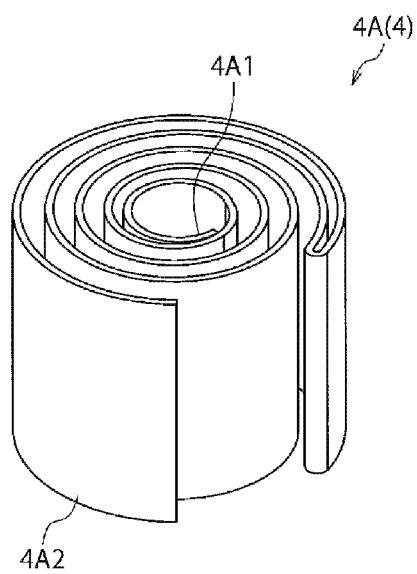

FIG. 10 illustrates an example of another form of a vibration actuator according to an example according to the present invention. In this example, the elastic supporting member 4 that supports the magnet 2 (or the movable element 10) so as to be able to rotate elastically is a flat spiral spring 4A. An overall cross-sectional diagram is illustrated in (a) and the structure of the flat spiral spring 4A is illustrated in (b), where identical codes are assigned to those parts that are identical to those in the example illustrated in FIG. 7, and redundant explanations thereof are omitted. The flat spiral spring 4A is a thin plate-shaped elastic member that is wound in a spiral shape, where the inner end 4A1 is secured to the rotational shaft 11 and the outer end portion 4A2 is secured to the bearing case 14 so as to provide torsional elasticity to rotation in one direction of the rotational shaft 11.

In a vibration actuator 1 that uses the flat spiral spring 4A as the elastic supporting member 4, the flat spiral spring 4A has high rigidity in directions other than the direction of rotation, to make it possible to produce a stable rotational vibration, without energy loss, of the elastic supporting member 4, through twisting, without deformation, relative to the rotation of the rotational shaft 11. Note that while FIG. 10 shows an example wherein the elastic supporting member 4 of the example illustrated in FIG. 7 is replaced with the flat spiral spring 4A, the elastic supporting member 4 in the examples illustrated in FIGS. 9 (a) and (b) can also, similarly, be changed into flat spiral springs 4A.

Figure 11:
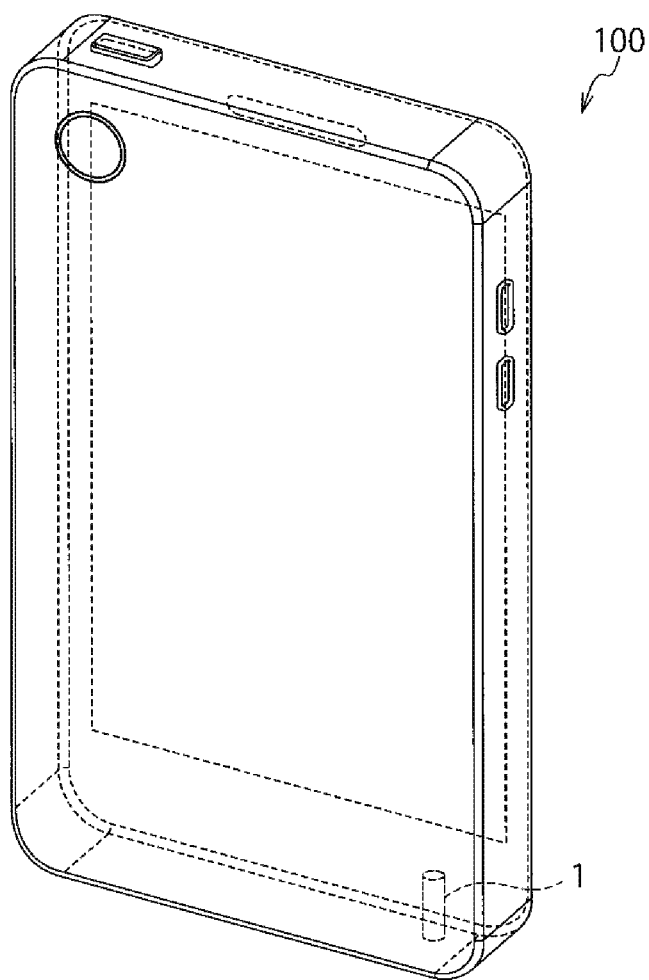
FIG. 11 is an explanatory diagram illustrating a mobile electronic instrument that is provided with a vibration actuator according to an example according to the present invention.

FIG. 11 illustrates a mobile electronic instrument that is provided with a vibration actuator according to an example according to the present invention. The mobile electronic instrument 100, provided with a vibration actuator 1 that has these distinctive features not only enables the noise that is produced to be kept at a minimum when notifying a mobile user, through vibration, of a signal event, such as an incoming call or an alarm, but also enables the reliable transmission of a signal through a large vibration amplitude. The vibration actuator 1 according to the example according to the present invention has no contact point rectifier, resulting in high reliability and durability, and is a mechanism wherein, fundamentally, the movable element 10 does not strike the case, so is able to provide a vibration actuator that can produce a larger vibration amplitude in a smaller size through the use while suppressing the production of noise, such as a striking noise. Moreover, shifting the positions of the magnet 2 and the coil 5 along the rotational shaft 11 enables greater thinness. The mobile electronic instrument 100 that is provided with a vibration actuator 1 having such distinctive features is not only able to minimize the production of noise when the mobile user is notified, through a vibration, of a signal event, such as an incoming call or an alarm, but is also able to reliably convey the signal through a large vibration amplitude. Moreover, it enables the mobile electronic instrument 100 to be made even thinner.

While examples according to the present invention were explained in detail above referencing the drawings, the specific structure is not limited to these examples, but rather design changes, and the like, within a range that does not deviate from the spirit and intent of the present invention are also included within the present invention. Furthermore, the various examples described above may be combined together using each other's technologies insofar as there are no particular problems or contradictions with the purposes, structures, and the like, thereof.

The invention claimed is:

1. A vibration actuator comprising:
   a movable element comprising
      a magnet that is supported to be rotatable, relative to a case, around a shaft,
      a weight supported to be rotatable together with the magnet, and
      an elastic supporting member wherein a rotation of the magnet and the weight is supported elastically;
   a coil that is supplied with an AC current at a frequency that is equal to a resonant frequency of the movable element; and
   a magnetic pole member that causes the movable element to undergo reciprocating a rotational vibration around the shaft through applying rotational torques in different directions alternatingly to the magnet by changing magnetic poles through the AC current that is applied to the coil;
   wherein the elastic supporting member comprises a first end secured to the case and a second end secured to at least one of the magnet, the weight, and the shaft.

2. The vibration actuator as set forth in claim 1, wherein:
   the magnet is provided with different magnetic poles around the shaft; and
   the magnetic pole member has a plurality of magnetic poles that face the magnetic poles of the magnet.

3. The vibration actuator as set forth in claim 1, wherein:
   the shaft comprises a rotational shaft that is supported by a pair of bearings to be rotatable, wherein:
   the magnet and the weight are disposed along the rotational shaft.

4. A vibration actuator comprising:
   a movable element comprising
      a rotational shaft that is supported on at least one bearing, wherein the rotational shaft rotates relative to a case which supports the at least one bearing,
      a magnet that is secured to the rotational shaft,
      a weight that is secured to the rotational shaft, and
      an elastic supporting member wherein a rotation of the magnet and the weight is supported elastically;
   a coil that is supplied with an AC current at a frequency that is equal to a resonant frequency of the movable element; and
   a magnetic pole member that applies rotational torques in different directions alternatingly to the magnet by changing magnetic poles through the AC current that is applied to the coil, wherein:
   the coil, the magnet, and the weight, are arranged lined up along the rotational shaft; and
   the elastic supporting member comprises a first end secured to the case and a second end secured to at least one of the magnet, the weight, and the rotational shaft.

5. The vibration actuator as set forth in claim 4, further comprising:
   a coil holding member wherein the coil is wrapped around a cylindrical portion through which the rotational shaft passes, wherein:
   the magnetic pole member comprises a plurality of magnetic poles that support the coil holding member in a position away from the magnet and extends along outside of the magnet to the rotational shaft.

6. The vibration actuator as set forth in claim 4, wherein:
   the at least one bearing comprises a pair of bearings and is secured to the magnetic pole member; and
   the weight is secured to the rotational shaft, which extends to the outside of the pair of bearings.

7. The vibration actuator as set forth in claim 4, wherein:
   the elastic supporting member is a flat spiral spring wherein an inner end portion is secured to the rotational shaft and an outer end portion is secured to a case that supports the bearings.

8. A mobile electronic instrument comprising:
   a vibration actuator including:
      a movable element having a magnet that is supported to be rotatable, relative to a case, around a shaft, a weight supported to be rotatable together with the magnet, and an elastic supporting member wherein a rotation of the magnet and the weight is supported elastically;

a coil that is supplied with an AC current at a frequency that is equal to a resonant frequency of the movable element; and a magnetic pole member that causes the movable element to undergo reciprocating a rotational vibration around the shaft through applying rotational torques in different directions alternatingly to the magnet by changing magnetic poles through the AC current that is applied to the coil;

wherein the elastic supporting member comprises a first end secured to the case and a second end secured to at least one of the magnet, the weight, and the shaft.

\* \* \* \* \*